(12) United States Patent
Simmons, Jr. et al.

(10) Patent No.: US 6,238,504 B1
(45) Date of Patent: May 29, 2001

(54) METHOD FOR PAPERBOARD PRODUCTION

(76) Inventors: Raymond C. Simmons, Jr., 1503 Michaux Rd., Chapel Hill, NC (US) 27514; W. Lamar Brown, 1903 Clearview Dr., Ringgold, GA (US) 30736

( * ) Notice: Subject to any disclaimer, the term of this patent is extended or adjusted under 35 U.S.C. 154(b) by 0 days.

(21) Appl. No.: 09/120,972

(22) Filed: Jul. 22, 1998

Related U.S. Application Data

(60) Provisional application No. 60/053,522, filed on Jul. 23, 1997.

(51) Int. Cl.$^7$ ................................. B31F 1/20; C09J 5/08
(52) U.S. Cl. ............................ 156/78; 156/210; 156/336
(58) Field of Search .................................. 156/205, 210, 156/470, 471, 472, 77, 78, 336

(56) References Cited

U.S. PATENT DOCUMENTS

| | | | |
|---|---|---|---|
| 3,775,145 | 11/1973 | Ware et al. | |
| 3,936,339 | * 2/1976 | Lock et al. | 156/205 |
| 4,158,076 | * 6/1979 | Wallsten | 427/294 |
| 4,495,011 | 1/1985 | Scharfenberg et al. | |
| 4,561,918 | 12/1985 | Scharfenberg et al. | |
| 4,599,208 | * 7/1986 | Blaak | 261/83 |

* cited by examiner

*Primary Examiner*—Michael W. Ball
*Assistant Examiner*—Barbara J. Musser
(74) *Attorney, Agent, or Firm*—Bruce Gray; Kristin L. Johnson; Kilpatrick Stockton LLP

(57) ABSTRACT

The present invention relates to a method of applying adhesive to corrugating media to produce corrugated materials by foaming the adhesive with air prior to application to the flute tips of the corrugating media. The foamed adhesive requires less precise control of the applicator rollers, and remains in place on the flute tips, rather than migrating into the flute valleys. As a result, the same volume of adhesive can be used with decreased solids content, decreasing overall adhesive cost and increasing corrugator productivity. In addition, because of the more precise placement of the adhesive on the tips of the flutes, a stronger, higher quality board can be produced. The adhesive can be starch-based, and can be foamed by a variety of methods, such as in existing pin-rotor stator containing foaming machine used for foaming latices.

17 Claims, No Drawings

METHOD FOR PAPERBOARD PRODUCTION

This application claims benefit of the filing date of U.S. Provisional application Ser. No. 60/053,522, filed Jul. 23, 1997.

BACKGROUND OF THE INVENTION

FIELD OF THE INVENTION

This invention relates to the manufacture of paperboard products, in particular the manufacture of corrugated paperboard or boxboard products.

DESCRIPTION OF RELATED ART

Corrugated paperboard or boxboard products are made by adhering one or more sheets of linerboard to one or both sides of a fluted sheet of corrugating medium, which is typically a fluted sheet of paper, in large machines called corrugators. The corrugators apply adhesive to the corrugating sheet, assemble it with the sheets of linerboard, and heat the resulting assembly to dry and cure the adhesive. Viewed in cross section, the resulting boxboard contains alternating tips and valleys, having adhesive applied to the tips on one or both sides where they come into contact with, and are bonded to, the linerboard. Boxboard having a single sheet of linerboard bonded to the corrugating medium is generally referred to as "single face" board. An additional sheet of linerboard can then be applied to the single face to form a sandwich of corrugating material between two sheets of linerboard, known as "double back" board. Alternatively, two sheets of single face board can be bonded together, with the flat surface of one linerboard sheet bonded to the exposed surface of the corrugating medium of the other. An additional sheet of linerboard can be bonded to the remaining exposed surface of the corrugating medium to form what is known as "double wall."

The adhesives used to prepare corrugated boxboard are often starch-based, which are formulated and cooked by the corrugated board plant for use on their particular manufacturing equipment. In most corrugating plants, the adhesive is formulated, pumped to the corrugator, and re-circulated through various application stations. This approach can create a number of problems, however.

For example, the composition and properties of the adhesive may vary to some extent, depending on the quality of raw material used to formulate the adhesive and the precision with which the adhesive is formulated. Often, the starch-based adhesive has a rheology such that it does not remain only on the tips of the flutes of the corrugating material in the areas that come into contact with the linerboard. When this occurs, the adhesive can flow onto the inner surface of the adjacent valley. This results in excessive use and waste of adhesive, as well as the production of wetter board that requires longer drying time (decreasing production and increasing the chance of producing warped board production).

Addressing these problems by reducing the amount of starch-based adhesive applied to the corrugating medium is difficult, because this amount is difficult to control precisely. Most corrugators use a starch coating roll to apply the adhesive to the corrugating medium, and use a doctoring or metering roll near the applicator roll and separated therefrom by a variable gap to control the amount of adhesive that is applied. Decreasing the gap results in the application of a lower volume of adhesive, thereby decreasing adhesive consumption. However, this decreased volume of adhesive also reduces the performance of the boxboard as measured by pin number and edge crush tests. As a result, it is difficult to control the amount of adhesive applied with sufficient precision to properly balance adhesive consumption with board performance.

Another approach to decreasing starch consumption is to lower the solids content of the adhesive composition by diluting with water. Even if the viscosity of the starch composition is maintained, the use of additional water increases drying time, causing the corrugator to run more slowly and/or producing a wetter, poorer quality board.

Starch based adhesives of the type generally used in producing corrugated boxboard can generally be foamed only with difficulty. Unintended foaming, which occurs with some frequency with some other adhesives (see U.S. Pat. No. 3,775,145 at column 8, lines 50–65) is not commonly encountered, except for the occasional formation of large bubbles in the pans through which adhesive passes in the corrugated paper board-making process. This foaming is generally regarded as undesirable by corrugated board manufacturers, and the difficulty with which starch-based adhesives form a foam has been considered to be beneficial.

In certain circumstances, it is desirable to adhere labels to the exposed flute tips of corrugated board having a single sheet of linerboard bonded to the corrugating medium (called "single face" board). Often, white labels are affixed using either vinyl acetate or dextrin starch-based adhesives. The application of these adhesives can result in problems similar to those described above for the corrugating process itself.

Accordingly, there is a need in the art for a method of making corrugated board products that decreases adhesive consumption without compromising board quality or throughput. There is also a need in the art for a method of making corrugated board that provides stronger, higher quality board. Finally, there is a need for a process that achieves these objectives without the need for large, expensive additional machinery, and that can easily be connected to existing corrugator installations.

SUMMARY OF THE INVENTION

The needs described above are met by the process, apparatus, and corrugated board produced by the process of the present invention.

The present inventors have discovered that air can be dispersed into starch-based adhesives as a diluent and rheology modifier. In one aspect, the present invention relates to a method of preparing a corrugated sheet by incorporating an amount of air into a liquid adhesive that is sufficient to form a stable foam, applying this foamed adhesive to the tips of the fluted corrugating medium, placing the adhesive-coated tips in contact with a sheet of flat stock, and drying the adhesive for a sufficient time to adhere the flute tips to the flat stock.

The process utilizes air dispersion equipment to form the foam using either direct introduction of air, mechanical or static means to incorporate air into the starch compound and form a foam via fluid shear or turbulence, or a combination of these techniques. The amount of air dispersed can vary depending upon the particular adhesive formulation used, but is typically between approximately 10% and 30% (by volume). In one embodiment of the invention, the starch-based adhesive is saturated with dispersed air. The foam obtained by the process of the present invention can be easily and precisely applied to the tips of the corrugating medium, and the amount of adhesive applied can be more accurately controlled.

In one embodiment of the invention, the foam-forming characteristics of the process of the invention can be improved by the addition of a surfactant, such as sodium alkyl sulfonates.

Corrugated paper board manufacturing plant data shows acceptable performance on all flute and linerboard combinations using a foamed starch-based adhesive in accordance with this invention. The air injection process allows the corrugated board manufacturer to reduce starch consumption by applying the same physical volume of adhesive at reduced solids level. Since the air alters the adhesive rheology without altering liquid adhesive viscosity, the quantity of adhesive applied remains on the flute tips without migrating into the flute valleys. Because the adhesive is located properly and remains in the proper location, the process of the present invention uses less starch, yet gives a stronger bond, and thus a stronger sheet, than prior processes. The process of the present invention results in boxboard having increased pin numbers on both single face and double backed board, and the corrugated board products produced by the process of the present invention forms another aspect of the invention.

The process of the present invention achieves improved board quality with decreased adhesive consumption, increased running speeds, and avoids common corrugator problems. While it requires additional equipment, the savings achieved from decreased adhesive consumption and decreased rejection of poor quality board makes the process economically desirable. In addition, the additional equipment can be isolated for maintenance and alteration, and can be configured to connect to existing plumbing available in most corrugator installations. Moreover, the process of the present invention can use relatively small scale, less expensive foaming equipment, making the necessary capital investment within the reach of smaller and medium sized corrugated manufacturers.

In another aspect, the present invention relates to a particular apparatus used to introduce air into the liquid adhesive. More specifically, the present invention relates to a foaming machine having a stator forming an internal chamber and a rotor within the chamber having a plurality of radial pins, as well as means for introducing air and liquid adhesive into the space between the rotor and the stator. In stator-rotor mixing and foaming apparatus of this type (referred to herein as a "homogenizer"), the conventional radial pins are generally round in cross section. However the present inventors have found that round pins, while they can be used to prepare adhesive foams according to the invention, do not achieve as high of a shear effect as pins that are square in cross section. Square pins have been found to allow the incorporation of considerably larger quantities of air into the foam. This is believed to occur because square pins provide a larger contact surface with the adhesive/air mixture, as well as sharp edges, increasing the shearing forces imposed on the adhesive/air mixture. Pins may be used on both the inner surface of the stator and the outer surface of the rotor, or may be on the stator only or on the rotor only. The apparatus of the present invention also comprises an adhesive applicator pan wherein the level of foam in the pan is controlled to a preset value by actuating, e.g., a valve from the foaming apparatus to admit additional foam, and/or by actuating the foaming apparatus itself to produce additional foam.

The present invention can be more clearly understood by reference to the following detailed description, which is not intended to limit the scope and applicability of the present invention.

DETAILED DESCRIPTION OF SPECIFIC EMBODIMENTS

As described above, one aspect of the invention relates to a process having the steps of:
  (1) incorporating an amount of air into a liquid adhesive sufficient to form a stable foam;
  (2) applying the foamed adhesive to tips of flutes of a fluted corrugating medium;
  (3) placing the tips in contact with a sheet of flat stock; and
  (4) drying the adhesive for a sufficient time to adhere the flute tips to the flat stock.

The present invention is applicable to a wide range of starch-based adhesive compositions commonly used to prepare corrugated board. For example, a typical starch-based adhesive comprising water, starch, caustic soda (to modify carrier texture and/or gel point), and borax (as a carrier extender) can be used.

As described above, the present invention includes the inclusion of air into the starch-based adhesive composition prior to application to the corrugating medium. A number of different techniques can be used to incorporate a suitable amount of air into the liquid adhesive to form a foam. In one embodiment of the invention, this amount is typically from about 10% to about 30% by volume, based on the starch-based adhesive composition. In a particular embodiment of the present invention, the amount of air introduced into the liquid starch-based adhesive composition is the maximum amount that the liquid adhesive can hold as a foam. In other words, the liquid starch-based adhesive composition is saturated with air. However, when a saturated foam is used, the volume of air introduced is typically kept below about 50 vol %, as higher amounts tend to make the foam too thick and difficult to apply using metering and applicator rollers.

One method of dispersing air into the adhesive is by direct introduction of air bubbles by, e.g., sparging. While suitable foaming can be attained with a suitably sized and distributed orifices in a perforated pipe, better results can be obtained using porous septa, such as coarse porous porcelain, silica, alumina, glass, carbon, polymer, or metals, to provide air bubbles. Porous septa having relatively large pore sizes and/or high porosity can be used, as this will allow for greater volumetric flow rate of air. This flow rate should be selected to maximize foaming and minimize coalescence of the formed bubbles.

Alternatively, static or mechanical mixing apparatus can be used in the present invention, provided that they are suitable for foaming a liquid. Static foam-forming equipment that may be used includes venturi nozzle type mixers typically used for mixing steam and/or air with water, jet diffusers, impingement aerators, pipeline contactors or dispersers containing orifices, baffles, marbles, helices and/or short constrictions. Mechanical mixing or foaming equipment that may be used includes mechanical agitators typically having high pumping rate rotors. Suitable mechanical agitators include wire whip agitators, serrated disk agitators, disk agitators, turbine agitators, and impellers. Often it is desirable to combine one or more of these methods, for example sparging air into the liquid adhesive composition in conjunction with mechanical agitation by a rotating impeller.

By way of example, the present inventors have found that mixing equipment or homogenizers used to form foams of latices or other foamed materials used in the textile industry is suitable for foaming the starch-based adhesive according to the present invention. More particularly, foamers having pin rotors and stators, such as those used to mix and foam latices, are particularly suitable. This type of roamer contains a chamber formed by the interior surface of a stator, which may be jacketed for temperature control. Inside this chamber is a cylindrical rotor having a number of pins extending radially from the cylinder. Starch-based adhesive and air are pumped into the chamber, either individually or together through a mixing valve, and intimately and thoroughly admixed by the rotating pins. Typically, the rotor rotates at a velocity of between about 200 r.p.m and about 400 r.p.m., although the precise rotational speed will depend to some extent upon the composition and physical properties of the starch-based adhesive, the amount of air to be incorporated, and the desired cell size of the resulting foam. The result is a relatively stable, small celled foam that can be prepared without the use of a surfactant or gelling agent. As a specific example, "Super Foamer" equipment having "500" model numbers and modified with square cross section pins, both available from Latex Equipment Sales & Service Inc. (LESSCO) may be used to incorporate air into starch-based adhesives according to the present invention.

The foam is then introduced into a starch applicator pan for application to the flute tips of the corrugating material. A level controller on the starch applicator pan maintains the level of foamed adhesive in the applicator pan at a preset level, either by actuating valves admitting additional foam to the pan when the level drops, or by actuating the foaming equipment itself to produce additional foam. An applicator roller comes into contact with the foam in the applicator pan. The foam transferred to the surface of the applicator roller then passes through the gap between the applicator roller and a metering or doctor roller. This gap is generally of about the size used to apply conventional adhesive to corrugated board, but in the present invention actually meters less adhesive by weight because of the air included in the foam. The applicator roller then applies the adhesive to the tips of the flutes, which are then brought into contact with linerboard using methods known in the art and used in conventional corrugators. Typically, the adhesive is dried by heating the board to a temperature between about 100° C. and about 200° C. for a time period between about 5 seconds and about 60 seconds.

As indicated above, the present invention allows good adhesion and high quality board to be obtained with reduced starch consumption. Adhesive consumption has been reduced by between about 15% and about 25%. In addition, the corrugator can run faster using the present invention because of the lower overall water addition to the liner and flute substrates (decreasing drying duty of the corrugator). This reduction in water also reduces the tendency of the corrugated sheet to warp, resulting in a higher quality, flatter sheet. The reduction in water also allows the board to remain relatively rigid, retaining more of the physical and mechanical characteristics of the dry liner and corrugated media sheets. Although the solids content of the foamed adhesive is reduced, the same volume of adhesive is applied to corrugating media, so that the same areas on the liner sheet(s) and flutes of the corrugating medium are covered with adhesive, so that potential problems with gaps in adhesive coverage are avoided. As a result of using less adhesive, the overall cost of the product is reduced.

As pointed out above, this reduction in cost comes without any decrease in product quality, and in fact, the quality of the product actually increases as a result of the more precise placement of adhesive that is possible when the adhesive is foamed in accordance with the present invention. The board product that results from corrugating processes using adhesive application according to the present invention has increased pin numbers, irrespective of whether the product is single face or double backer board. For example, it has been found that single face pin numbers increased from an average of about 45–50 to an average of about 60–65.

When the starch-based adhesive is foamed according to the present invention, its appearance changes from a watery liquid to a thick, smooth batter-like foam, and its surface tension appears to be lower. As a result, the adhesive more evenly coats the starch applicator roll, and is therefore more uniformly applied to the flutes. This makes the gap setting for the applicator roll/metering roll less critical, which in turn makes the adhesive application process easier to control.

Although the amount of air incorporated into the adhesive composition can vary, it is generally desirable to incorporate between about 10% and 30% (by volume) of air, with the precise amount depending on the particular starch formulation. For example, with a starch formulation of.

| COMPONENT | LBS. |
| --- | --- |
| Primary Water | 638 |
| Primary Pearl Starch | 100 |
| Caustic Addition | 28.1 |
| Cooling Water | 1397 |
| Secondary Pearl Starch | 624 |
| Secondary Borax | 10.0 |
| Resin Addition | 20 |
| Liquid Carrier | 35 | it is desirable to incorporate between about 15 vol % and about 25 vol % of air. It is generally desirable to incorporate the maximum amount of air that the starch-based adhesive can accept. Too much air gives air blow-by, which means that the air blows through the foaming machine or homogenizer and is not incorporated in the starch. When the adhesive is saturated with air, decreased amounts of light foam build up in the applicator pan. Reduced foam build up in the applicator pan avoids common starch runnability problems. Foam build up in the applicator pan reduces the adhesive pickup or addition and causes loss of adhesion of the liner to the medium.

When a foam generating homogenizer of the type described above is used, the foaming system may also comprise an overflow tank and level controls on the adhesive applicator pans. By contrast to existing adhesive application methods, adhesive is typically not recirculated because freshly foamed adhesive appears to give better performance, at least in part because freshly foamed adhesive retains more of the injected air. Recirculated adhesive must be refoamed, which can change its foamability properties. Thus, recirculation results in the need for a much larger capacity foaming apparatus or homogenizer because of the increased adhesive flow. Without recirculation, a 15 gal/min. homogenizer has sufficient capacity to supply two single face adhesive application pans and two double backed adhesive application pans. As a result, a relatively inexpensive homogenizer can be used to supply sufficient adhesive for a relatively large throughput of boxboard.

As described above, one of the aspects of the present invention is the apparatus for applying foam adhesive to the tips of corrugating medium flutes by introducing air into the liquid adhesive to form a suitable foam. That apparatus is a type of pin-rotor homogenizer containing:

a stator comprising an inner surface enclosing a chamber;

a rotor rotatably disposed within the chamber and comprising a central cylindrical shaft and a plurality of radially extending pins, such that a space exists between the surface of the central cylindrical shaft and the stator;

means for rotating the rotor;

means for supplying air to the space;

means for supplying liquid adhesive to the space.

As discussed above, the pins may be of different cross-sectional shapes, but are desirably of square cross section to increase the shear stress imposed by the rotor. Also as indicated above, the pins may also be disposed on the inner surface of the stator. The foam leaving the homogenizer is desirably introduced into an applicator pan having level control to maintain a preset foam level. The foam in the applicator pan is then introduced onto the surface of an applicator roller that rolls through the foamed material in the pan. The thickness of foam on the applicator roller is controlled by the presence of a parallel metering or doctoring roller, or by a doctor blade, disposed near the applicator roller and separated therefrom by a gap.

The means for rotating the rotor may include a motor, typically electrically powered, that rotates at a suitable speed. Desirably the speed of rotation is variable and controllable in order to adjust the power input to the homogenizer to achieve the appropriate foam cell size and air content. The motor may be directly coupled to the rotor, or indirectly coupled via a belt, clutch, or other suitable mechanism for transmitting power in a power train. In addition, any arrangement that can provide sufficient power to rotate the rotor at suitable velocities can be used in place of a dedicated motor, such as belt arrangements that divert power from the moving parts of a corrugator, etc.

The means for supplying air to the space and the means for supplying liquid adhesive to the space typically include hosing, tubing or other conduit materials of a size and capacity sufficient to supply the desired volumetric flow rate of each of these materials. A suitable pump or compressor may be used if necessary to provide an appropriate pressure feed to the space. For example, any suitable pump, such as a positive displacement or centrifugal pump, may be used to supply the liquid adhesive through a suitably sized plastic, metal, or rubber tube or pipe to the space. An air compressor or available supply of compressed air may be used to supply air to the space through pneumatic hose. Both may be connected to the rotor or stator using suitable connectors, valves, etc.

As described above, in one embodiment of the process of the invention a surfactant can be used, typically a sodium alkyl sulfate surfactant. One suitable surfactant for use in the process of the invention is the "System 205" surfactant available from Surfactant Systems, Inc., 2877 Five Springs Road, (P.O. Box 2468), Dalton, Ga. "System 205" is described by Surfactant Systems, Inc. as "proprietary sodium sulfonate," and is a clear amber liquid having a solids content of 27.0–29.0%, a pH of 9.50 to 10.50, a viscosity at 20° C. of 1000 cps, and a density of 1.05 to 1.07. It is typically incorporated into the starch-based adhesive composition in an amount ranging from about 0.01 wt % to about 0.05 wt %, based on the weight of the starch-based adhesive composition.

EXAMPLE

A Langston corrugator was run to corrugate a variety of different weight linerboards and corrugating media with application of a starch based adhesive of the type described above. The adhesive was foamed using a LESSCO 500 rotor-stator foaming apparatus modified to have square pegs as described above. B flute corrugating medium was corrugated into boxboard having a basis weight between about 125 and 275. C flute corrugating medium was corrugated into boxboard having a basis weight between about 125 and 350. Double wall boxboard was prepared having a basis weight between about 200 and 600. Line speeds for the B flute runs were approximately 200 to 600 ft/min. The foaming apparatus incorporated air into the liquid adhesive in amounts greater than about 10 vol %, and the applied adhesive did not run into valleys of the flutes, resulting in the use of less adhesive. The resulting corrugated boards possessed acceptable flatness, and the heat duty of the corrugator was appropriately reduced.

The present invention having been described above by reference to specific embodiments and examples, it will be apparent to those of skill in the art that various modifications and variations of the invention are possible that do not depart from its spirit. These modifications and variations are intended to be encompassed within the scope of the appended claims and equivalents thereto.

What is claimed is:

1. A method of preparing a corrugated sheet, comprising:
   incorporating an amount of air into a liquid starch adhesive sufficient to form a stable foam;
   applying the foamed adhesive to tips of flutes of a fluted corrugating medium;
   placing the tips in contact with at least one sheet of flat stock; and
   drying the adhesive for a sufficient time to adhere the flute tips to the flat stock.

2. The method of claim 1, wherein the flat stock is paperboard or cardboard.

3. The method of claim 1, wherein the incorporating of air into the liquid adhesive comprises mixing air with the liquid adhesive with a mechanical agitator.

4. The method of claim 3, wherein the mechanical agitator comprises a stator and a rotor having radially extending pins on the surface thereof.

5. The method of claim 4, wherein the pins have a square cross section.

6. The method of claim 4, wherein the stator further comprises radially extending pins on the inner surface thereof.

7. The method of claim 1, wherein the air is incorporated into the liquid adhesive in an amount ranging from about 10 vol % to about 30 vol %.

8. The method of claim 1, wherein the air is incorporated into the liquid adhesive in an amount sufficient to saturate the liquid adhesive.

9. The method of claim 3, wherein the mechanical agitator comprises a stator and a rotor, wherein the liquid adhesive and air are introduced between the stator and the rotor, and wherein the rotation of the rotor disperses the air into the liquid adhesive to form a stable, small-celled foam.

10. The method of claim 1, wherein the applying of the foamed adhesive comprises introducing the foamed adhesive to a gap between a metering roller and an applicator roller wherein the gap is of sufficient size to evenly coat the applicator roller with foamed adhesive, and contacting the fluted corrugating medium with the applicator roller.

11. The method of claim 1, wherein the flat stock is a sheet of linerboard.

12. The method of claim 11, wherein the linerboard is applied to a single side of the corrugating medium, to form single face corrugated board.

13. The method of claim 11, wherein the linerboard is applied to both surfaces of the corrugating medium, to form double backed corrugated board.

14. The method of claim 1, wherein a first sheet of flat stock is a label applied to one of the sides of the corrugating medium.

15. The method of claim 14, wherein a second sheet of flat stock is a sheet of linerboard applied to the other side of the corrugating medium.

16. The method of claim 1, wherein placing the tips in contact with the flat stock comprises introducing the corrugating medium and the flat stock into the nip of a pair of nip rollers.

17. The method of claim 1, wherein drying the adhesive comprises heating the corrugating medium and flat stock to a temperature of between about 100° C. and about 200° C. for a time period of between about 5 seconds and about 60 seconds.

* * * * *